Figure 1:
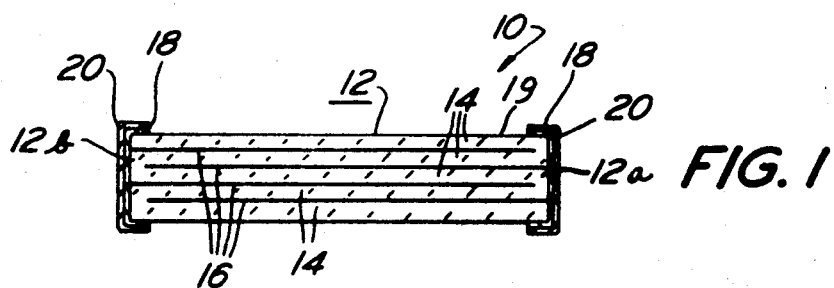

United States Patent [19]

Dunn

[11] 4,064,606

[45] Dec. 27, 1977

[54] METHOD FOR MAKING MULTI-LAYER CAPACITORS

[75] Inventor: William M. Dunn, Philadelphia, Pa.

[73] Assignee: TRW Inc., Cleveland, Ohio

[21] Appl. No.: 595,890

[22] Filed: July 14, 1975

[51] Int. Cl.$^2$ ............................................. H01G 4/06
[52] U.S. Cl. .................................. 29/25.42; 264/221; 264/277; 264/317; 269/7; 427/79; 427/282; 427/284
[58] Field of Search ...................... 29/25.42, 424, 559; 317/242, 258, 260, 261; 269/7; 264/261, 277, 221, 317; 427/79, 81, 123-125, 259, 282, 284

[56] References Cited

U.S. PATENT DOCUMENTS

| | | | |
|---|---|---|---|
| 995,537 | 6/1911 | Hertner et al. | 269/7 |
| 3,247,589 | 4/1966 | Burns | 29/424 |
| 3,252,205 | 5/1966 | Hancock et al. | 29/424 |
| 3,325,881 | 6/1967 | Engelking | 29/625 |
| 3,349,158 | 10/1967 | Maynard | 264/277 |
| 3,358,362 | 12/1967 | McElroy | 29/621 |
| 3,612,963 | 10/1971 | Piper et al. | 29/25.42 |
| 3,909,894 | 10/1975 | Muller | 29/25.42 |
| 3,992,761 | 11/1976 | McElroy et al. | 29/25.42 |

Primary Examiner—Carl E. Hall
Attorney, Agent, or Firm—Jacob Trachtman

[57] ABSTRACT

The method of producing a multi-layer capacitor which has a body of alternate layers of a dielectric and a conductor with each conductor layer being sandwiched between a pair of dielectric layers and with alternate ones of the conductor layers extending to opposite ends of the body. A nickel termination film is provided on each end of the body and contacts the conductor layers which extend to the respective end of the body and a solder film is coated on each termination layer. The capacitor bodies are terminated by mounting a plurality of the bodies on a support sheet and encapsulating the support sheet and capacitor bodies in a plastic block with the ends of the capacitor bodies being exposed at opposed surfaces of the block. The exposed ends of the capacitor bodies are simultaneously coated with the termination film and then the solder film, and the terminated capacitor bodies are removed from the block.

7 Claims, 12 Drawing Figures

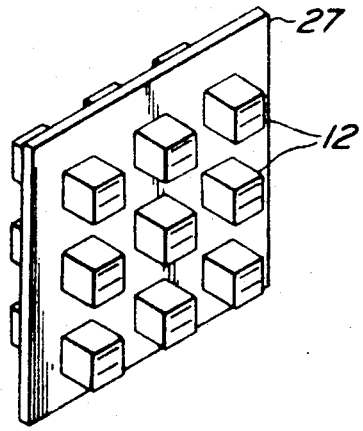
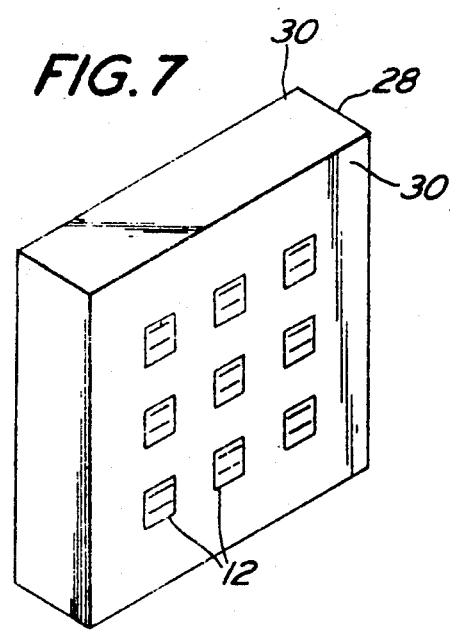
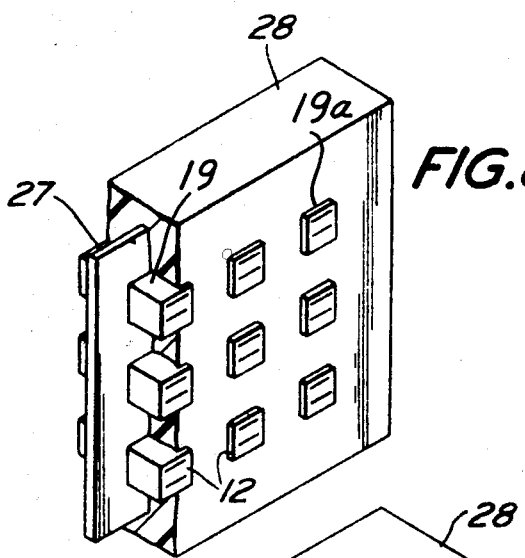
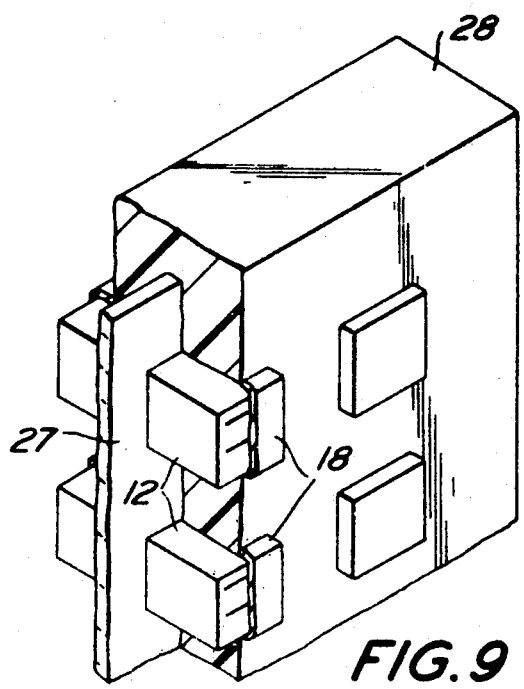
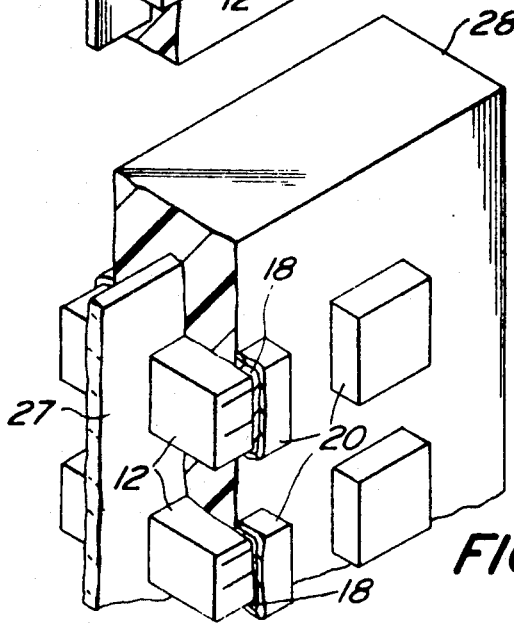

METHOD FOR MAKING MULTI-LAYER CAPACITORS

The present invention relates to a novel method of making multi-layer capacitors. More particularly, the present invention relates to a method and apparatus for supporting a plurality of multi-layer capacitors to permit applying terminations to the capacitors.

Multi-layer capacitors in general comprise alternate layers of a dielectric, such as a ceramic, and a metal conductor bonded together into a body. Alternate ones of the metal conductors are electrically connected together at one end of the body and the other of the conductors are electrically connected together at the other end of the body. Generally, the conductors are connected together by metal termination films coated on the ends of the body. A major problem in making these capacitors is in the manner of terminating the multi-layer capacitors so as to make good electrical contact to the conductors which extend to the ends of the body. It has been the practice to apply the termination to the ends of each body individually. However, this is not only time consuming and, therefore, expensive, but can also be difficult for very small size capacitors. Also, the terminations are generally of a noble metal, such as silver, which also adds to the cost of the capacitor.

Recently there has been developed a method of applying the termination wherein a plurality of the capacitor bodies are encapsulated in a plastic block with the capacitors arranged in spaced, parallel relation and with the ends of the capacitors being exposed at opposed surfaces of the block. The termination is applied to the exposed ends of the capacitor bodies. However, a problem with this method is in supporting the capacitors in order to encapsulate them in the block.

It is therefore an object of the present invention to provide a novel method of terminating a multi-layer capacitor.

It is another object of the present invention to provide a batch method of terminating multi-layer capacitors.

It is still another object of the present invention to provide a novel method of supporting multi-layer capacitors in order to permit terminating the capacitors.

It is a further object of the present invention to provide an apparatus for supporting multi-layer capacitors to permit encapsulation of the capacitors.

Other objects will appear hereinafter.

These objects are achieved by mounting multi-layer capacitor bodies on a thin support sheet with the bodies being in spaced, substantially parallel relation. While on the support sheet the bodies are encapsulated in a block of material with the ends of the bodies being at opposed surfaces of the block. The termination can then be applied to the ends of the bodies. The bodies can be mounted on the support sheet by inserting the bodies through holes in the support sheet. Alternatively, the bodies can be mounted between two spaced, parallel sheets having an adhesive layer on the opposed surfaces of the sheets so that the ends of the bodies are adhered to the sheets.

Figure 2:
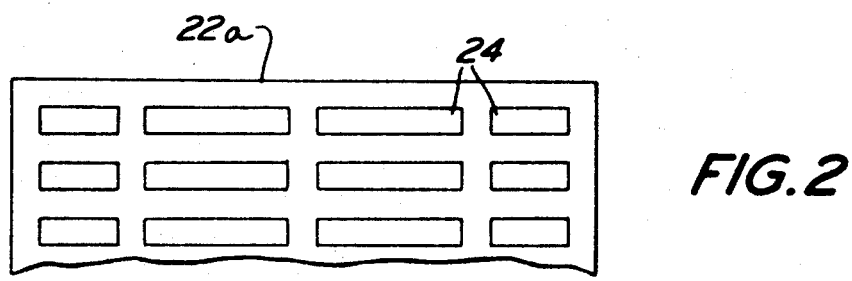
Figure 3:
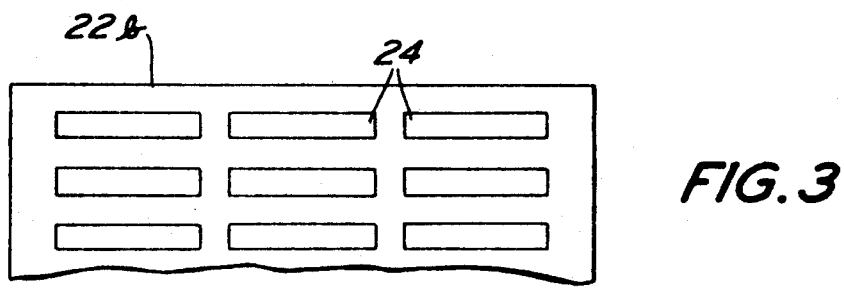
Figure 4:
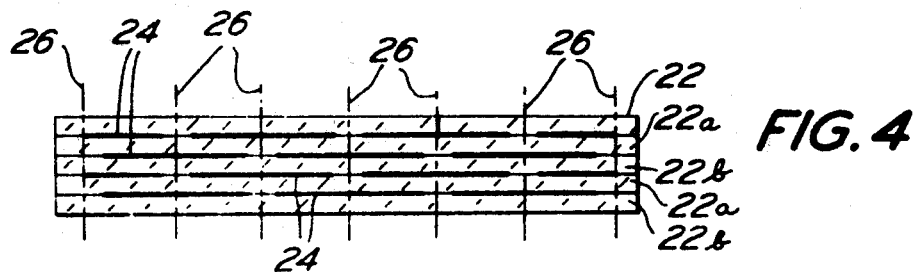
Figure 5:
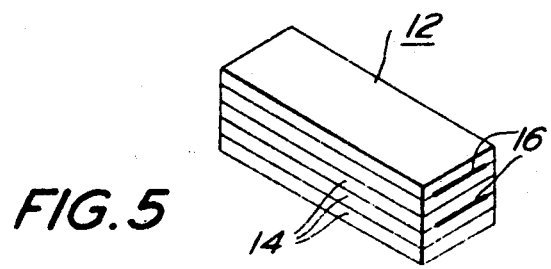
Figure 11:
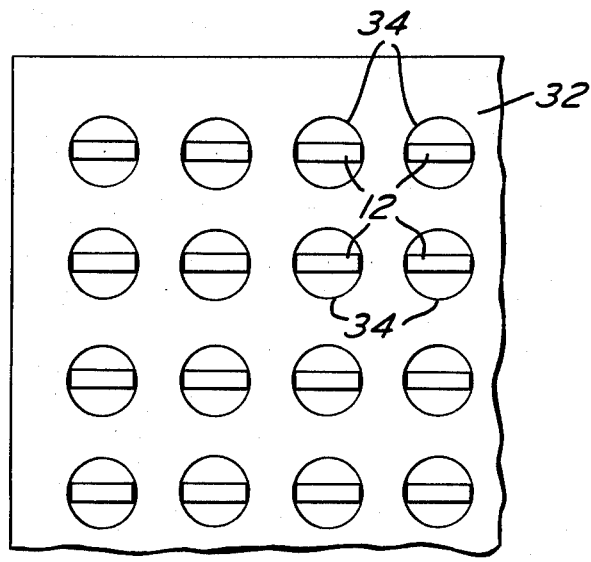
Figure 12:
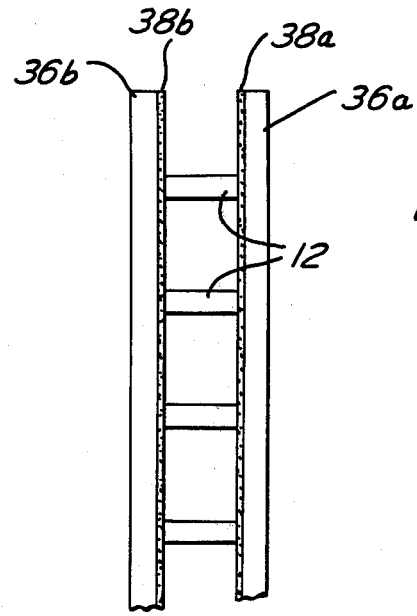

For a fuller understanding of the nature and objects of the invention, reference should be had to the following detailed description taken in connection with the accompanying drawings, in which:

FIG. 1 is a longitudinal sectional view of one form of the multi-layer capacitor of the present invention, FIGS. 2 and 3 are plan views of portions of the metalized ceramic layers used to make the capacitor of the present invention, FIG. 4 is a sectional view showing the metalized ceramic layers laminated together, FIG. 5 is a perspective view of a capacitor body made from the laminate shown in FIG. 4, FIG. 6 is a perspective view showing a plurality of the capacitor bodies mounted on a support sheet of the present invention, FIG. 7 is a perspective view showing the capacitor bodies encapsulated in a plastic block, FIG. 8 is a perspective view, partially broken away, of the plastic block of FIG. 7 after being treated to expose the end portions of the capacitor bodies, FIG. 9 is a perspective view, partially broken away, of the plastic block of FIG. 8 with a termination film being coated on the capacitor bodies, FIG. 10 is a perspective view, partially broken away, of the plastic block of FIG. 9 with a solder layer on the termination films, FIG. 11 is a plan view of a modification of the support sheet of the present invention, FIG. 12 is an edge plan view of another modification of the support sheet of the present invention.

Referring initially to FIG. 1, a form of the multi-layer capacitor of the present invention is generally designated as 10. The capacitor 10 comprises a substantially right parallelepiped body 12 made up of alternate dielectric layers 14 and conductive layers 16 laminated together. The outer layers of the body 12 are both dielectric layers 14 so that each conductive layer 16 is sandwiched between two dielectric layers 14. The dielectric layers 14 may be of a material having the desired dielectric constant for the particular capacitor being made. Preferably, the dielectric layers 14 are of a ceramic material, such as the barium titanate ceramics. The conductive layers 16 may be of any conductive material. However, the conductive layers 16 are preferably of a relatively non-oxidizable metal which does not react with the material of the dielectric layers 14, such as silver, gold, platinum, palladium or mixtures or alloys thereof. A preferred means for applying the conductive layers 16 is by screen printing.

Alternate ones of the conductive layers 16 extend to one end 12a of the body 12, but are spaced from the other end 12b of the body 12, whereas the other conductive layers 16 extend to the other end 12b of the body but are spaced from the one end 12a. Although the body 12 is shown as having four conductive layers 16, it may include any number of the conductive layers depending on the desired capacitance of the capacitors 10. At the ends 12a and 12b of the body 12, there are exposed respective conductive layers 16 which extend to the particular end of the body 12.

A separate termination film 18 is on each end 12a and 12b of the body 12 and extends over a short portion of the outer surface 19 of the body 12 proximate to the ends 12a and 12b. The termination films 18 adhere to the dielectric layers 14 and contact the conductive layers 16 at the respective ends of the body. Thus, each termination film 18 electrically connects in parallel a plurality of the conductive layers 16. The termination films 18 are of any electrically conductive metal, but are preferably of nickel. Each of the termination films 18 may be coated with a layer 20 of solder to improve their oxidation resistance.

To make the multi-layer capacitor 10 in accordance with the method of the present invention, the first step is to make a plurality of the multi-layer capacitor bodies 12. One method of achieving this is to form a plurality of green, unfired sheets 22 of ceramic particles mixed with a binder, such as polyvinyl chloride or polyvinyl acetate. Each of the sheets 22 is coated on one side with rectangular areas 24 of a conductive material with the areas 24 being arranged in a pattern of rows and columns. Some of the sheets 22a are coated with the conductive areas 24 in a pattern such as shown in FIG. 2 wherein the areas in the end columns are one-half the width of the areas in the other columns. Some of the sheets 22b are coated with the conductive areas in a pattern such as shown in FIG. 3 wherein all of the areas are of the same width. A plurality of the coated sheets 22a and 22b are then stacked on each other in alternating relation as shown in FIG. 4. The sheets are arranged with the coated sides facing the same direction and an uncoated sheet 22 is placed over the conductive areas at the top of the stack. For example, in the stack of the sheets shown in FIG. 4, the sheet 22b shown in FIG. 3 is at the bottom of the stack followed by a sheet 22a, then another sheet 22b, then another sheet 22a and finally on top an uncoated sheet 22. Thus, each pattern of conductive areas is sandwiched between two dielectric sheets.

In the stacked array of the coated sheets, the rows of conductive areas are in directly overlapping, stacked arrangement. However, as shown in FIG. 4, the columns of the conductive areas are off-set so that the space between each column of conductive areas of each sheet extends along the middle of the column of the conductive areas on the adjacent sheets. The stacked sheets are then laminated together by the application of sufficient pressure to achieve adherence between the sheets. The laminated sheets are then divided into the individual capacitor bodies 12 by cutting along all of the spaces between the columns of the conductive areas as indicated by the dash lines 26 in FIG. 4, and cutting along the spaces between the rows of the conductive areas. Where a cut is made along the overlapping spaces between the columns of the conductive areas of two of the sheets, the cut will go through the center of the conductive areas of the other two sheets. Thus, the conductive areas of the two sheets will be spaced slightly from the cut edge whereas the conductive areas of the other two sheets will extend directly to the cut edge. Thus, in each of the resultant capacitor bodies 12, each of the conductive areas will extend directly to an edge of the body but will be spaced slightly from the other end edge with alternate conductive areas extending to opposite end edges of the bodies. The capacitor bodies 12 are then fired at a temperature high enough to sinter the ceramic particles of the sheets together to form a hard ceramic body having the conductors embedded therein.

Instead of making the laminated stacked array of sheets shown in FIG. 4 from preformed sheets as described above, a similar structure can be made by a spray coated technique. For this technique a metal base plate is spray coated with a ceramic slurry. After the ceramic layer dries, a pattern of conductive areas is coated on the ceramic layer either by spraying through a mask or by silk screening. Additional layers of the ceramic material and the conductive material are similarly applied in sequence with the final layer being a ceramic layer. The resultant laminate is then removed from the metal plate and cut into the individual capacitor bodies 12 which are then fired.

A plurality of the fired capacitor bodies 12 are then inserted through holes in a thin support sheet 27 as shown in FIG. 6. The support sheet 27 is of an inexpensive, disposable material, such as cardboard or a plastic. The holes are preferably slightly smaller than the capacitor bodies 12 so that the capacitor bodies will fit tightly in the holes. The capacitor bodies 12 are positioned in the holes so that the end surfaces of all of the bodies at each side of the support sheet 27 are substantially coplanar.

The support sheet 27 with the capacitor bodies 12 inserted therethrough is then encapsulated in a block 28 of a plastic material with the plastic block 28 having opposed, substantially flat surfaces 30 which are substantially coplanar with the end surfaces of the capacitor bodies 12 and with the end surfaces of the capacitor bodies being exposed at the flat surfaces 30 of the block 28 as shown in FIG. 7. This may be accomplished by using a suitable rectangular mold with opposite sides extending proximate to or in contact with the end surfaces of the capacitor bodies 12 received therein. The block 28 is of a material which is relatively inexpensive and which is controllably soluble in a solvent which does not attack the material of the capacitor bodies 12. Polyester resins have been found suitable for this purpose. However, epoxy, polyurethane, silicone and thermoplastic resins as well as such waxes as candle waxes can also be used. The encapsulation can be carried out in a suitable mold.

The block 28 is then immersed in a suitable solvent for a period of time necessary to dissolve or soften the surface of the block 28. As previously stated, the solvent is one which will slowly dissolve the particular plastic being used but does not attack the material of the ceramic bodies 12. When the plastic is a polyester resin, methylene chloride has been found to be a satisfactory solvent. Chlorinated solvents can be used for epoxy and silicone resins, alcohols or ketons for polyurethane, and various hydrocarbon solvents for waxes. When the block 28 is removed from the solvent, it is washed with water to remove the softened surface layer of the block 28 and any of the solvent. This exposes a portion 19a of the outer surfaces 19 of each of the capacitor bodies 12 at each end of the capacitor bodies as shown in FIG. 8. The amount of the outer surface 19a at the ends 12a and 12b of the capacitor bodies 12 which is exposed depends on the length of time that the block 28 is immersed in the solvent. Using methylene chloride as a solvent for a polyester resin, and leaving the block 28 in the solvent for approximately ten minutes will dissolve a sufficient amount of the plastic to expose about 0.02 inch of the outer surface 19a of the capacitor bodies 12 at each end of the bodies.

The exposed ends of the capacitor bodies 12 are then immersed in a suitable etchant for the particular dielectric material providing a roughened or pitted surface for improving the adherence of the nickel terminations 18 to the end surfaces of the capacitor bodies 12. When the dielectric material is a barium titanate ceramic, the etchant may be hydrofluoric acid, fluoboric acid or a mixture of organic fluorides in hydrofluoric acid. Also, when the dielectric material is a barium titanate a second etch may be required to insure removal of the barium fluorides formed during the initial etch.

As shown in FIG. 9, a termination film 18 of an electrically conductive metal, such as nickel or copper, is then simultaneously coated on the exposed surface of each of the capacitor bodies 12. The termination films 18 are applied by the well known process of electroless plating, such as described in U.S. Pat. No. 3,075,855 to M. C. Agens, issued Jan. 29, 1963, entitled "Copper Plating Process and Solutions," No. 3,095,309 to R. J. Zellisky et al, issued June 25, 1963, entitled "Electroless Copper Plating," and No. 2,968,578 to J. M. Mochal, issued Jan. 17, 1961, entitled "Chemical Nickel Plating on Ceramic Material." It is well known that electroless plating first requires that the object to be plated be treated with a sensitizer prior to being subjected to the plating composition. To apply the termination films 18 to the exposed surfaces of the capacitor bodies 12, the entire block 28 is immersed in the sensitizing material so that the surfaces of the block 28 as well as the exposed surfaces of the capacitor bodies 12 are sensitized. The block 28 is then again immersed in the solvent for the material of the block to dissolve or soften the surfaces of the block 28. This removes the sensitized surfaces of the block 28 leaving only the exposed surfaces of the capacitor bodies 12 being sensitized. Thus, when the entire block 28 is subjected to the plating material, the metal will only plate on the sensitized exposed surfaces of the capacitor bodies 12 including the extending ends of the conducting layers 16 and the dielectric layers 14 and on the surfaces of the ends 12a, 12b to form the termination films 18.

The end surfaces of the blocks 28 from which the capacitor bodies 12 project may then be immersed in a bath of molten solder. Since the solder will only adhere to a metal surface, only the termination films 18 become coated with the solder to provide the solder layers 20 as shown in FIG. 10. The block 28 is then again immersed in the solvent bath and left in the solvent until all of the plastic is dissolved so as to separate the individual capacitors 10 in the block 28. After the plastic is completely dissolved, the individual capacitors 10 are removed from the solvent and washed to remove the solvent.

Referring to FIG. 11, a modification of the support sheet is generally designated as 32. The support sheet 32, like the support sheet 27, is of an inexpensive, disposable material, such as cardboard or plastic. The support sheet 32 has a plurality of circular holes 34 therethrough. The capacitor bodies 12 are rectangular in transverse cross-section with one cross-sectional dimension being larger than the other cross-sectional dimension. The holes 34 are of a diameter slightly smaller than the larger cross-sectional dimension of the bodies 12. Thus, when the bodies 12 are inserted through the holes 34, the bodies will be held firmly on the support sheet.

Referring to FIG. 12, there is shown another modification of the support which is particularly suitable for very short bodies. For example, for making capacitors having bodies which are of a length of 1/16 inch or less, the support sheets having holes into which the bodies are inserted would not be completely acceptable. The support sheets are generally about 1/32 inch in thickness so that the bodies would not project enough beyond the support sheet to permit encapsulation with the plastic material to form the block. This modification of the support includes two sheets 36a and 36b, each of an inexpensive, disposable material. Each of the sheets 36a and 36b has a layer 38a and 38b respectively of an adhesive on a surface of the sheet. The sheets 36a and 36b are arranged in spaced, parallel relation with the adhesive layers 38a and 38b facing each other. The bodies 12 are mounted in spaced, parallel relation between the sheets 36a and 36b with the ends of the bodies contacting and being adhered to the adhesive layers 38a and 38b.

To mount the bodies 12 on the support, one of the sheets 36a or 36b is placed on a horizontal support with the adhesive layer 38a or 38b facing upwardly. The bodies are then placed on the sheet with an end of each body engaging the adhesive layer. The bodies will all be mounted in a vertical upright position on the one sheet. The other sheet with the adhesive layer facing downwardly is then placed over and in contact with the upright ends of the bodies. The support can then be placed in a mold and the space between the sheets is filled with the plastic material to encapsulate the bodies in the block. When the block is formed, the sheets 36a and 36b are removed to expose the ends of the bodies. By filling the space between the sheets with the plastic material, when the sheets are removed, the ends of the bodies will be substantially flush with the surfaces of the plastic block. The process of terminating the bodies can then be completed in the manner previously described.

The method of the present invention for making multi-layer capacitors on a mass production basis has the following advantages:

1. Because of the small size of the capacitor bodies 12, it is much easier to handle the plastic block 28 which contains a plurality of the capacitor bodies, during the application of the termination films and solder layers than it is to handle the individual capacitors bodies. Although the plastic block is shown as containing only a few of the capacitor bodies 12, it can contain as many as 100 or more.

2. The capacitor supporting sheets also facilitate the automation of the method for making the capacitors while the adhesive support sheet also has the advantage of removing the requirement for aligning the capacitor bodies for insertion through the openings of the apertured support sheet.

3. The adhesive support sheet also can be used for positioning extremely short capacitor bodies by engaging their ends and allowing the encapsulating material to completely surround the bodies intermediate their ends.

4. It is desirable to have the termination films 18 extend around a portion of the outer surfaces of the capacitor bodies to permit ease of mounting the capacitors in a circuit. The method of the present invention provides for ease of applying the termination films 18 to the outer surfaces of the capacitor bodies with control of the extent of the outer surface covered by the termination films.

5. By the use of the plastic blocks, a plurality of the capacitor bodies are simultaneously subjected to each step of the method of the present invention so that a desired number of the capacitors can be manufactured quicker than if the capacitor bodies were individually subjected to the various steps.

6. Since a plurality of the capacitor bodies are simultaneously subjected to each step of the termination method of the present invention, the cost of manufacture per capacitor is considerably less than if the capacitor bodies were individually subjected to the various steps.

7. The method of the present invention permits the use of an inexpensive metal for the termination films so as to reduce the cost of the capacitor.

Thus, the method of the present invention provides for the mass production of the multi-layer capacitors 10 with greater ease of handling the capacitors, with greater speed and at a lower cost per capacitor.

The present invention may be embodied in other specific forms without departing from the spirit or essential attributes thereof, and, accordingly, reference should be made to the appended claims, rather than to the foregoing specification as indicating the scope of the invention.

What is claimed is:

1. A method of making a multi-layer capacitor comprising the steps of:
   a. forming a plurality of bodies of substantially final length and width with each body having alternate layers of a dielectric material and a conductive material with each conductive layer being sandwiched between a pair of dielectric layers and with some of said conductive layers extending to one end of said body but being spaced from the opposite end of the body, and the other of said conductive layers extending to the said opposite end of the body but being spaced from the said one end of the body;
   b. mounting said bodies in spaced, substantially parallel relation on a thin support sheet having a layer of adhesive on one surface with one end of each of said bodies contacting and adhering to the adhesive layer;
   c. encapsulating said supported bodies in a block of dissolvable material having opposed substantially flat surfaces with the bodies being in spaced parallel relation and having their ends adjacent to said flat surfaces of said block;
   d. removing the support sheet and coating the ends of said bodies with a film of a conductive metal with the films contacting the conductive layers of the body which extend to the respective ends of the body; and then
   e. separating the bodies from the material of the block.

2. A method in accordance with claim 1 including a second support sheet having a layer of adhesive on one surface extending across the other ends of the bodies with the other ends of the bodies contacting and adhered to the adhesive layer on the second support sheet, the second support sheet being removed after the encapsulating of the bodies and prior to the coating of their ends.

3. A method in accordance with claim 2 in which the bodies are encapsulated in the block by filling the space between the support sheets with the dissolvable material.

4. In a method of making multi-layer capacitors wherein a plurality of bodies each of alternate layers of a dielectric material and a conductive material are formed with some of the conductive layers extending to one end of said body but being spaced from the opposite end of said body; the bodies of substantially final length and width are encapsulated in a block of dissolvable material with the bodies being in spaced, parallel relation and with the ends of the bodies being adjacent opposed surfaces of the block; the ends of the bodies are coated with a film of a conductive metal to electrically connect the conductive layers extending to the end of the body; and the bodies are then separated from the block, the steps of prior to encapsulating the bodies, mounting the bodies in spaced, substantially parallel relation on a thin support sheet having a layer of adhesive on one surface with one end of each of said bodies contacting and adhering to the adhesive layer, encapsulating the bodies in a dissolvable material while on said support sheet, and removing the support sheet to expose the contacted ends of said bodies.

5. A method in accordance with claim 4 including a second sheet having a layer of adhesive on one surface, said second sheet extending across the other ends of the bodies with the other ends of the bodies contacting and adhered to the adhesive layer on the second sheet, and the second sheet being removed after the encapsulating of the bodies.

6. A method in accordance with claim 5 in which the bodies are encapsulated in the block by filling the space between the sheets with the dissolvable material.

7. A method in accordance with claim 6 in which after the bodies are encapsulated in the block, the support sheets are removed to expose the ends of the bodies.

* * * * *